(12) United States Patent
Lin et al.

(10) Patent No.: US 6,603,770 B2
(45) Date of Patent: Aug. 5, 2003

(54) APPARATUS AND METHOD FOR ACCESSING A NETWORK

(75) Inventors: Freddie Lin, Redondo Beach, CA (US); Ling Sha, Los Angeles, CA (US); Frank Tian, Temple City, CA (US); Duke Tran, Norwalk, CA (US)

(73) Assignee: Physical Optics Corporation, Torrance, CA (US)

( * ) Notice: Subject to any disclaimer, the term of this patent is extended or adjusted under 35 U.S.C. 154(b) by 0 days.

(21) Appl. No.: 09/761,110

(22) Filed: Jan. 16, 2001

(65) Prior Publication Data

US 2002/0093969 A1 Jul. 18, 2002

(51) Int. Cl.[7] .............................................. H04L 12/28
(52) U.S. Cl. ...................................... 370/401; 370/466
(58) Field of Search ................................. 370/401, 400, 370/410, 406, 356, 352, 333, 355, 242, 354, 421, 463, 465, 468, 419; 379/220.9, 16, 17, 225; 209/249, 250, 225, 220; 713/201

(56) References Cited

U.S. PATENT DOCUMENTS

| 5,991,292 A | * 11/1999 | Focsaneanu ................ 370/352 |
|---|---|---|
| 6,094,439 A | 7/2000 | Krishna et al. |
| 6,125,177 A | * 9/2000 | Whittaker .................... 379/243 |
| 6,130,896 A | 10/2000 | Lueker et al. |
| 6,134,662 A | 10/2000 | Levy et al. |
| 6,151,628 A | * 11/2000 | Xu ............................ 709/225 |
| 6,233,616 B1 | * 5/2001 | Reid .......................... 709/225 |
| 6,269,101 B1 | * 7/2001 | Gerszberg |
| 6,314,108 B1 | * 11/2001 | Ramasubramani .......... 370/465 |
| 6,351,773 B1 | * 2/2002 | Fijolek ....................... 709/228 |
| 6,353,609 B1 | * 3/2002 | Ethridge ...................... 370/352 |
| 6,363,065 B1 | * 3/2002 | Thornton .................... 370/352 |

OTHER PUBLICATIONS

A White Paper on Next Generation Passive Optical Networks, Terawave Communications, Mar., 2000.
Affordable Fiber–To–The Business, A CLEC Guide to Success, Quantum Bridge.
Metropolitan Service Providers, River Stone Networks, www.yagosys.com, Sep. 27, 2000.
Cable Networks and the Regional Distribution of Broadband Services, Chromatis, Lucent Technologies.

* cited by examiner

*Primary Examiner*—Douglas Olms
*Assistant Examiner*—Ricardo M. Pizarro
(74) *Attorney, Agent, or Firm*—Leonard Tachner

(57) ABSTRACT

An apparatus and method that provides access between an enterprise network and at least one of a metropolitan area network and a wide area network. The apparatus includes an enterprise area network connection, a controller coupled to the enterprise area network connection, the controller providing Layer 1 and Layer 2 service, and a central office connection coupled to a central office, the central office providing Layer 3 and Layer 4 service. The controller transmits unmapped data across the central office connection to the central office and the central office maps the unmapped data onto a desired format.

25 Claims, 11 Drawing Sheets

APPARATUS AND METHOD FOR ACCESSING A NETWORK

BACKGROUND OF THE INVENTION

1. Field of Invention

The present invention is directed to an apparatus and method for accessing a network.

2. Description of Related Art

Presently, service providers provide access networks in the long-haul and metropolitan network markets. Unfortunately, the present network access equipment used by the service providers fails to account for numerous problems.

One problem is that the equipment breaks the network infrastructure into an access network owned and operated by the service provider and an enterprise network owned and operated by enterprises. Thus, a hard boundary is created between a service provider's access network and an enterprise's network. Therefore, both the service provider and the enterprise must aggregate, provision, and manage all of their network signals within their own territory before they interface with each other in the boundary between their networks. This type of network design creates many problems. Such problems include reduced revenue for service providers, increased network infrastructure investment for both service providers and enterprises, and increased network complexity for enterprises.

Another problem exists in that almost all of today's optical access network equipment vendors position their business to service providers, not to enterprises. Thus, the equipment they make is primarily used by service providers. The equipment design is often tailored for some specific network architectures such as passive optical networks, mesh/ring networks, and the like, as well as for some specific customer base such as multi-tenant units, application providers, internet service providers, aggregations of DSL and cable modem traffic, and the like. As a result, the equipment only targets a limited number of service providers who share the same network infrastructure, vision, and design as the vendors. Therefore, many optical access network equipment vendors fail or only have very limited success if a majority of service providers choose not to use their design strategy.

Another problem exists in that service providers tend to be hesitant to adopt new solutions. They are hesitant because they do not desire to be stuck with an equipment vendor's platform that may not satisfy the needs of their customers, such as enterprises, in a short period of time after they spend tens or hundreds of million dollars for network infrastructure build-up. In addition, problems such as the rate of telecommunication obsolescence, the long cycle of network plans and equipment trials, and the conservative corporate culture in new business are risks for optical access network equipment vendors, in particular selling equipment to service providers. Thus, optical access network equipment vendors need to have contingent plans to sustain their cash flow to survive.

The above noted problems all result from a business model approach which is to build an access network for enterprises from a network service provider point of view. Because of this business model, the access equipment developed is typically based on a network design scheme which combines in one box Layers 1 (physical), 2 (link), 3 (network), and even 4 (transport) design, as well as TDM cross-connect switching, cell switching, packet switching and routing, and many others. This approach may work if the equipment vendor knows what network infrastructure a customer wants. However, this approach is very risky because of the diversity of service providers and their targeted applications. In addition, this box design attempts to be good at every last function, while it is not the best at any one single function. Furthermore, with so many diverse functions built in, these boxes also compete with top breed switches and routers produced by top router market leaders. Thus, it is an up-hill battle for optical access network equipment vendors with this type of business model to provide marketable services and products.

SUMMARY OF THE INVENTION

According to a first embodiment, the present invention provides an access device that provides access between an enterprise network and at least one of a metropolitan area network and a wide area network. The access device includes an enterprise area network connection, a controller coupled to the enterprise area network connection, the controller providing Layer 1 and Layer 2 service, and a central office connection coupled to a central office, the central office providing Layer 3 and Layer 4 service. The controller transmits unmapped data across the central office connection to the central office and the central office maps the unmapped data onto a desired format. Furthermore, the controller transmits time division multiplexing (TDM) data, packetized data, video data, and audio data across the central office connection to the central office and the packetized data includes at least one of Ethernet/Fast Ethernet/Gigabit Ethernet data and Asynchronous Transfer Mode data and the TDM data includes at least one of T1, DS1, T3, DS3, STS-1, or SONET data. Additionally, the controller is a first controller, the central office includes a second access device controller, and the first controller transmits data through the central office connection to the second access device located at the central office. The controller receives data from the enterprise area network connection and multiplexes the data received from the enterprise area network connection with other data.

Also, the enterprise area network connection of the access device includes a first enterprise area network connection and the access device further includes a second enterprise area network connection, and the controller receives second data from the second enterprise area network connection and multiplexes the second data with the data received from the first enterprise area network connection. The access device further includes an access device connection that provides a connection to a second access device.

In addition, the central office provides Layer 3 and Layer 4 service to at least one of the metropolitan area network and the wide area network. The controller further includes a timeslot allocation table including timeslot allocation information, and a transmitter coupled to the timeslot allocation table wherein the transmitter transmits data and updated timeslot allocation information in accordance with the timeslot allocation information. The controller receives data from the enterprise area network connection and provides dynamic timeslot allocation for transmitting the data through the central office connection to the central office. Also, the controller receives data from the enterprise area network connection and provides dynamic timeslot allocation for transmitting the data through the second access device connection to the second access device.

The access device further includes a timeslot controller coupled to the timeslot allocation table. The timeslot controller receives updated timeslot allocation information and updates the timeslot allocation table with the updated timeslot allocation information. The updated timeslot allocation information includes information regarding the addition of channels as well as the removal of channels.

According to another embodiment, the present invention provides an access device that provides the connection of a first local area network to a second local area network comprising a first local area network connection providing a connection to a first local area network, a second local area network connection providing a connection to a second local area network, and a controller coupled to the first local area network connection and coupled to the second local area network connection, the controller providing Layer 1 service and Layer 2 service for direct connection of the first local area network to the second local area network without connection to a Layer 3 device. The controller receives data from the first local area network connection and transmits data across the second local area network connection to the second local area network and also transmits TDM data, packetized data, video data, and audio data across the second local area network connection to the second local area network.

Additionally, the access device further includes a central office connection coupled to a central office, the central office providing Layer 3 and Layer 4 service. The central office includes a second access device controller and the controller transmits data through the central office connection to a second access device located at the central office. The access device further includes a second access device connection, wherein the second access device connection provides a connection to a second access device. Also, the central office provides Layer 3 and Layer 4 service to at least one of a metropolitan area network and the wide area network. The controller further includes a timeslot allocation table including timeslot allocation information, and a transmitter coupled to the timeslot allocation table wherein the transmitted transmits data and updated timeslot allocation information in accordance with the timeslot allocation information.

The access device further includes a timeslot controller coupled to the timeslot allocation table, wherein the timeslot controller receives updated timeslot allocation information and updates the timeslot allocation table with the updated timeslot allocation information. The updated timeslot allocation information includes information regarding the addition of channels and information regarding the removal of channels.

According to another embodiment, the present invention provides a method for providing service to a network, the network including a central office, a first local area network, and a second local area network. The method includes providing an access device which is part of a network service provider's network and transmitting data from the first local area network to the second local area networks through the access device. The data is transmitted through the access device using Layer 1 and Layer 2 services without the requirement of Layer 3 processing. The access device is maintained at a boundary between an enterprise network and a service provider network. The method further includes transmitting data to the central office using Layer 1 and Layer 2 services. The central office performs Layer 3 and Layer 4 processing. The access device is located at the edge of the first local area network and the network service provider's network. The network service provider's network includes at least one of a metropolitan area network and a wide area network.

According to another embodiment, the present invention provides a method of operating an access network. The method includes providing Layer 1 and Layer 2 services, and connecting to a service provider that provides Layer 3 and Layer 4 services.

Thus, the present invention provides an optical access network system from the enterprise point of view. This system creates a network infrastructure for both service providers and enterprises, regardless of their targeted architectures and applications. The system includes an access device that incorporates only physical layer (Layer 1) and link layer (Layer 2) functions. Therefore, both service providers and enterprises can independently select top-breed switches, routers, and/or cross-connects to address their target applications without being stuck on particular network architectures and applications.

In addition, using an access device, service providers can seamlessly connect their physical network infrastructure into enterprise networks and provide diversified voice/data/video services at many campus locations of the enterprises. This prevents enterprises from having to worry about network channel aggregation, provision, and management. This also essentially softens the hard boundary created between service providers and enterprises based on conventional optical access equipment. Service providers also benefit from the access device by not locking in expensive Layer 3 and 4 equipment in the beginning of network build-up. They can selectively incorporate Layer 3 and 4 equipment such as switches, routers, and/or cross-connects at the right time and at the right locations for the right application.

Additionally, the access device addresses real-time high-quality fall-motion audio/visual/data transmission applications such as distance learning for K-12 school districts, universities, and many businesses, security surveillance at city/state/federal government facilities, utilities, and many businesses, videoconferencing at hospital complexes, manufacturing facilities and the like, broadcast quality audio/video distribution at entertainment facilities, TV stations, movie postproduction houses, and the like. This creates new revenue streams for service provides providing real-time audio/visual/data transmission services under their network system.

BRIEF DESCRIPTION OF THE DRAWINGS

The preferred embodiments of the present invention will be described with reference to the following figures, wherein like numerals designate like elements, and wherein.

DETAILED DESCRIPTION OF PREFERRED EMBODIMENTS

Figure 1:
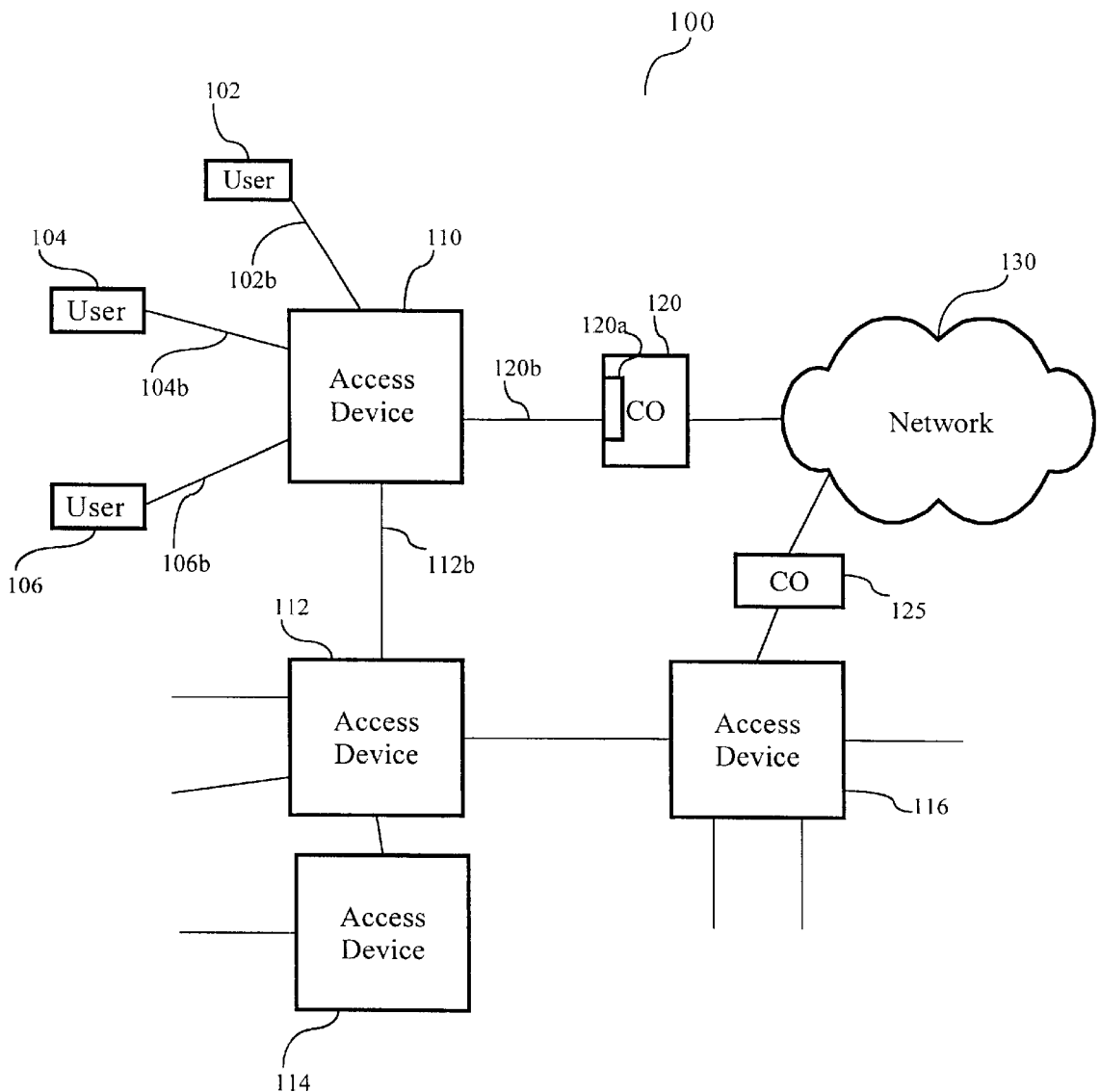
FIG. 1 is an exemplary illustration of a system for accessing a network according to a preferred embodiment.

FIG. 1 is an exemplary illustration of a system 100 for accessing a network 130 according to a preferred embodiment. The system 100 includes users 102, 104 and 106, user connections 102b, 104b and 106b, access devices 110, 112, 114 and 116, an access device connection 112b, central offices 120 and 125, a central office access device 120a, a central office connection 120b, and a network 130. Users 102, 104, and 106 are users such as individual terminals, local area networks, campus area networks, enterprises, or the like. For example, an enterprise includes an enterprise area network. The enterprise area network is a privately owned network for a business, in a building, for a university, in a multi-tenant unit, in an office park, or the like. The user connections 102b, 104b, and 106b are user connections such as enterprise area network connections, local area network connections, or the like. The connections transmit and receive data including multiservice data such as Ethernet data, Fast Ethernet data, Gigabit Ethernet data, SONET data, ATM/SONET data, Fiber Channel data, T1 data, native audio/video data, and other forms of data. All of the connections 102b, 104b, 106b, 120b, and 112b include optical fiber, twisted pair connections, or any other medium useful for transmitting data.

Central office 120 is a connection system such as a service provider, a central office, a point of presence, a head end, or any other system that performs network data aggregation, switching and routing functions or provides for connection to a network. For example, a service provider provides service to a network 130 such as a wide area network, a metropolitan area network, an Internet Service Provider network, an Internet Protocol (IP) network, a voice service provider network, or the like. Thus, central office 120 provides service to a backbone network for data communication within or across cities. The central office 120 exists at the edge of the network 130 and provides Layer 3 and Layer 4 services. For example, Layer 3 and Layer 4 services are provided by cell and frame switches and routers. Typically, another access device 120a is located in the central office 120 to connect with the access device 110.

The system 100 provides for interactivity between the access devices. Accordingly, access device 110, 112, 114, and 116 provide an access network for accessing multiple users such as user 102, 104, and 106 and for accessing the network 130. Multiple access devices 110, 112, 114, and 116 and multiple users 102, 104, and 106 can be combined to form an individual enterprise network. For example, an enterprise network can include more than one access device 110.

The access device 110 acts at the boundary of the network 130 to transmit and receive multi-format data including time division multiplexing (TDM) data (DS0, T1, DS3, etc.), Asynchronous Transfer Mode over SONET data, Ethernet data, audio/video data, and the like. The access device 110 allocates a portion of bandwidth for the interactive purpose of the dynamic allocation of channels. For example, the access device 110 can allocate a timeslot for transmission of timeslot allocation information. Thus, the access device 110 allows a user 102 to dynamically reallocate the allocation of the user's bandwidth. For example, the user 102 can request the access device 110 to reconfigure the allocation of bandwidth, timeslots, or clock cycles based on the user's needs. Thus, the user 102 can increase or decrease the number of timeslots allocated to the user 102 or the width of the timeslots allocated to the user 102. For example, on an Ethernet network providing 10 Mb/s, the user 102 may begin with an allocation of 1 Mb/s. The user 102 can later request the access device 110 to increase the allocation from 1 Mb/s to 3 Mb/s. The user 102 can also request the access device 110 to reconfigure the allocation of bandwidth based on the user's needs. For example, the bandwidth of a timeslot can change from 10 Mb/s to 100 kb/s. The access device 110 can also increase or decrease the number of available timeslots in a specified time period. Thus, the number of available timeslots can be a fraction or a multiple of the original available timeslots. The user 102 can access the access device 110, for example, by using a web page linked to the access device 110 to change the bandwidth, timeslots, or clock cycles allocated to user 102.

In operation, a user 102 utilizes the access device 110 to access the network 130 or to access other access devices 112 and 116. The access device 110 accesses the network 130 through the central office 120. The access device 110 allocates a number of multiplexed timeslots of a specific length to the user 102 based on the user's desired bandwidth. If the user 102 later requires more or less bandwidth, the user 102 requests the access device 110 to change the bandwidth, the timeslots, or the duration of timeslots.

Figure 2:
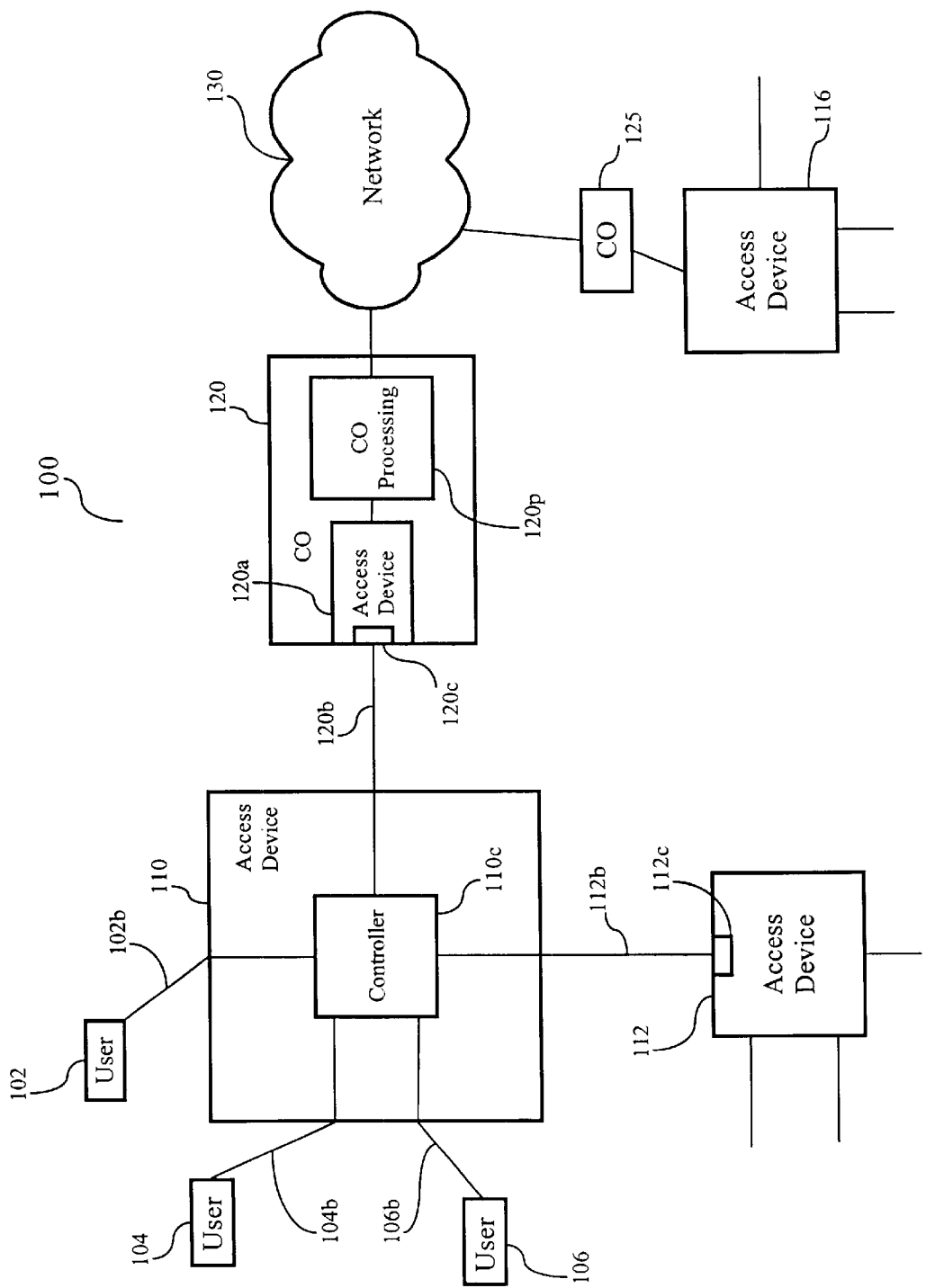
FIG. 2 is an exemplary illustration of a system for accessing a network according to another embodiment.

FIG. 2 is an exemplary illustration of a system 100 for accessing a network 130 according to another embodiment. As shown in FIG. 2, the access devices 110 and 112 includes controllers 110c and 112c respectively. Additionally, the central office 120 includes a central office access device 120a and a central office processing module 120p. The central office access device 120a also includes a controller 120c. The user connections 102b, 104b, and 106b transport packetized data, time division multiplexing (TDM) data, video data, audio data, and the like. Additionally, the central office connection 120b and the access device connection 112b also transmit TDM data, packetized data, video data, audio data, and the like. The central office processing module 120p performs Layer 3 and Layer 4 processing. For example, the central office processing module 120p maps data onto a common format, such as the Asynchronous Transfer Mode over SONET format or IP over SONET over high density wavelength division multiplexing (DWDM) format, for transmission across the network 130.

The controller 110c provides Layer 1 (physical layer) and Layer 2 service. The controller 110c combines data received from the users 102, 104, and 106, received from other access devices such as the access device 112, and received from the central office 120. The controller 110c also provides for dynamic timeslot allocation for multiplexed channels of data received from the connections 102b, 104b, 106b, 112b, and 120b. The controller 110c additionally provides for the adding and dropping of multiplexed channels of data received from the connections 102b, 104b, 106b, 112b, and 120b. Furthermore, the controller 110c provides for direct Layer 1 and Layer 2 connection between the users 102, 104, and 106 and the access device 112.

Figure 3:
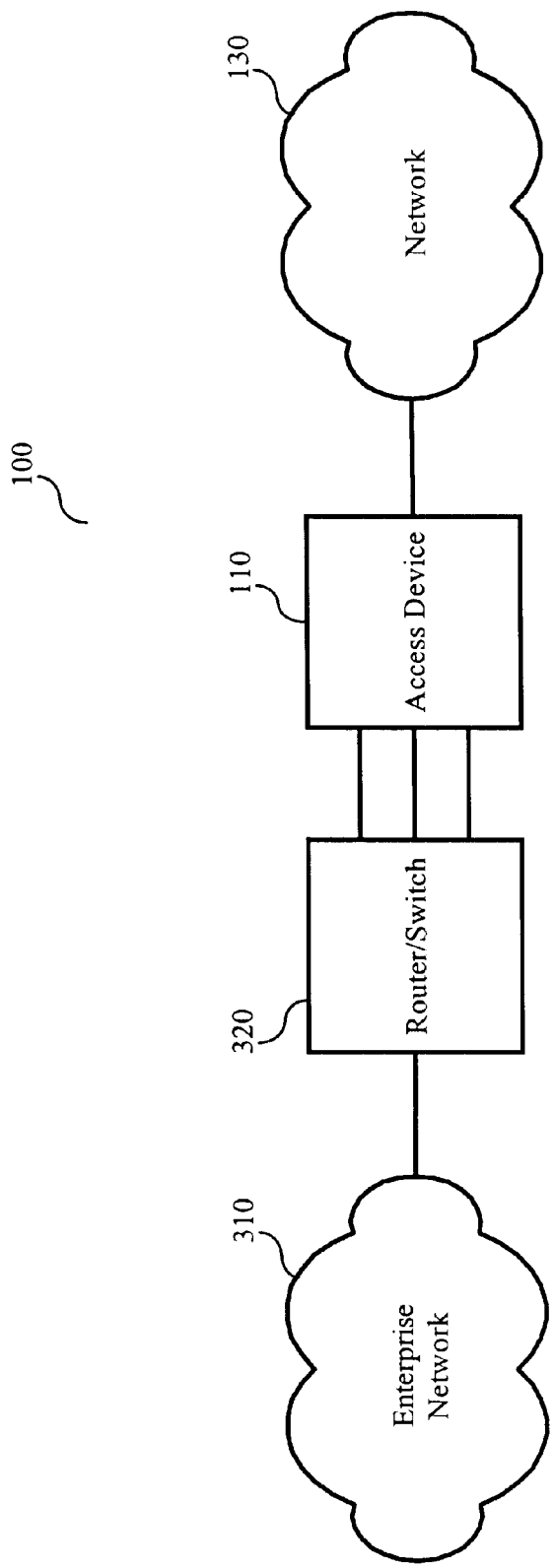
FIG. 3 is an exemplary illustration of the system for accessing a network according to another embodiment.

FIG. 3 is an exemplary illustration of the system 100 for accessing a network 130 according to another embodiment. The system 100 includes an enterprise network 310, a router and/or switch 320, an access device 110, and a network 130. The network is a network such as a metropolitan area network, a wide area network, or the like. FIG. 3 illustrates how the access device 110 is located at the boundary between the enterprise network 310 and the network 130. Thus, the access device 110 is located at the edge of the network 130 and the edge of the enterprise network 310. The access device 110 operates to transfer data signals between the enterprise network 310 and the network 130. For example, the access device 110 is located at a central office or locations near the enterprise network. In particular, the access device 110 is part of a service provider's network. The access device 110 provides Layer 1 and Layer 2 service without the requirement of Layer 3 and Layer 4 network processing.

Figure 4:
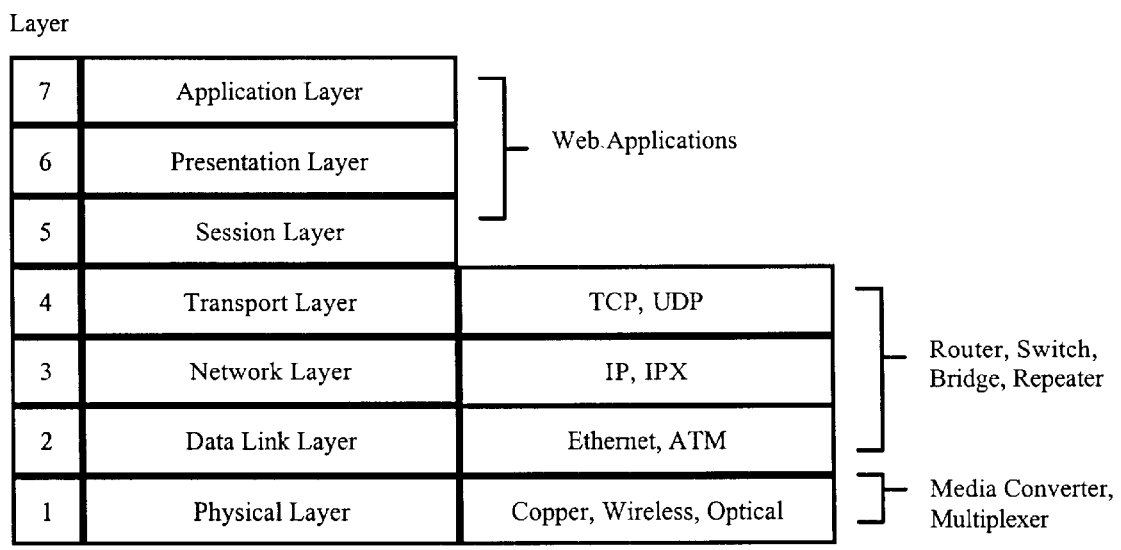
FIG. 4 is an exemplary illustration of the Open System Interconnect model.

FIG. 4 is an exemplary illustration of the Open System Interconnect (OSI) model. FIG. 4 illustrates the interrelationship between the different layers of the model and the data formats used in the lower layers. The lower layers, such as the Layer 1 Physical Layer, are more hardware based than the upper layers. Consequently, the upper layers, such as the Layer 4 Transport Layer, are more software based than the lower layers. As described above, the access device 110 provides Layer 1 and Layer 2 services without the requirement of Layer 3 and above processing.

Figure 5:
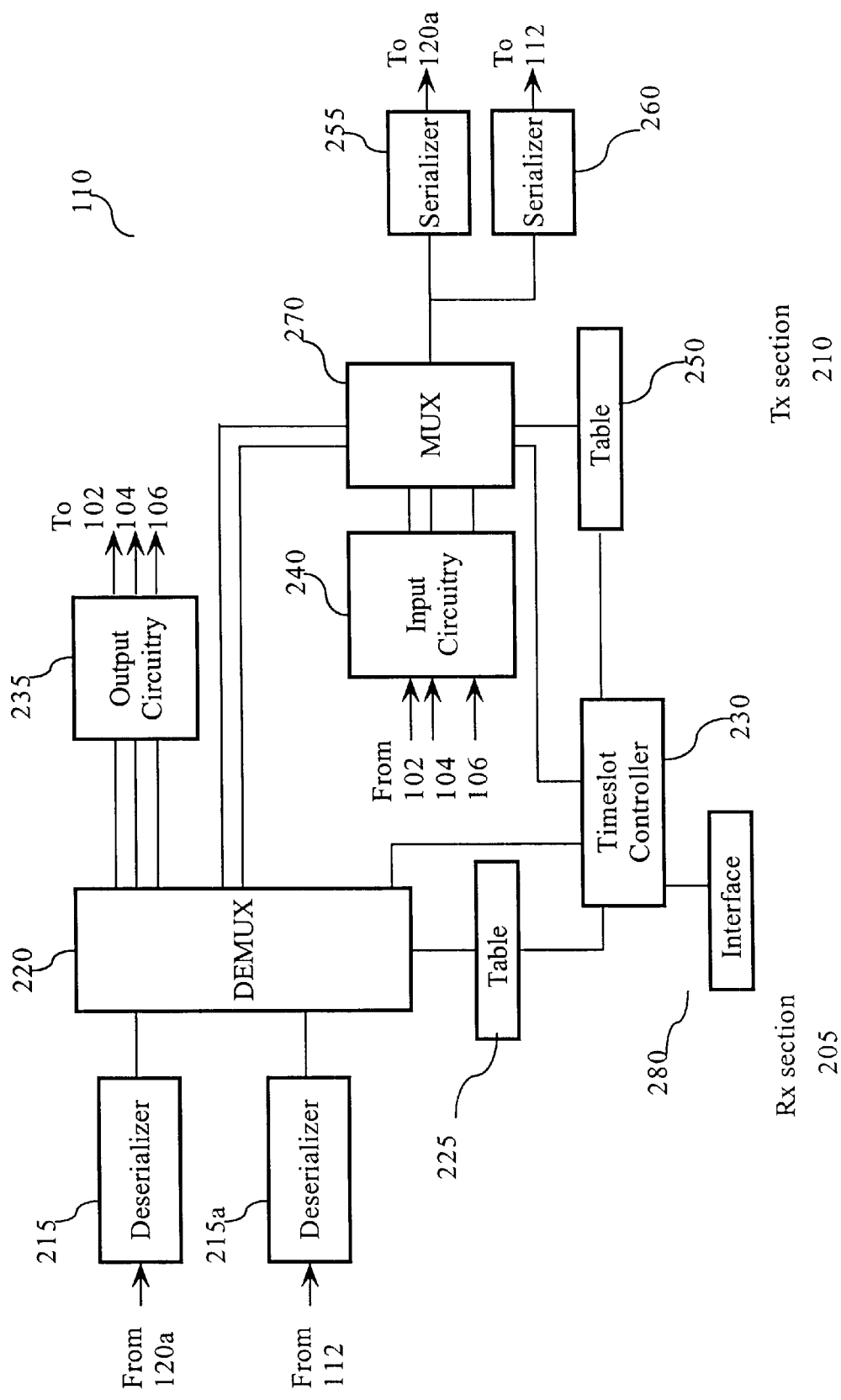
FIG. 5 is an exemplary illustration of an access device according to a preferred embodiment.

FIG. 5 is an exemplary illustration of an access device 110 according to another embodiment. All of the features and functions illustrated can be performed on the controller 110c (not shown) of the access device 110. The access device 110 can include a receiver section 205 and a transmitter section 210. The access device 110 can further include deserializers 215 and 215a, a demultiplexer 220, a receiver table 225, a timeslot controller 230, output circuitry 235, input circuitry 240, a transmitter table 250, serializers 255 and 260, a multiplexer 270, and an interface 280. The deserializer 215 deserializes data received from the central office 120 through the access device 120a. The deserializer 215a deserializes data received from the other access device 112 in FIG. 1. The demultiplexer 220 demultiplexes channels and timeslot allocation information from the deserialized data. The output circuitry 235 outputs dropped channels from the demultiplexer 220 to users 102, 104 and 106. The input circuitry 240 also receives added channels from users 102, 104 and 106. The input circuitry 240 conditions the channels and sends the channels to the multiplexer 270. The multiplexer 270 multiplexes the channels and timeslot allocation information. For example, the multiplexer 270 multiplexes updated timeslot allocation information in a reserved timeslot along with channels in other timeslots. The serializer 255 outputs data to the central office 120 via the access device 120a. Another serializer 260 outputs data to the access device 112. The connections between the access device 110 and user 102, 104, 106 and other access devices 112 and 120a can be either fiber optic or electrical cable/ twisted pair connections.

The receiver table 225 includes timeslot allocation information utilized by the demultiplexer 220 for demultiplexing the channels according to corresponding information in the timeslot allocation information. The transmitter table 250 includes timeslot allocation information utilized by the multiplexer 270 for multiplexing the channels and the updated timeslot allocation information. The interface 280 allows users to access the access device 110 to dynamically change the bandwidth, timeslots, or clock cycles allocated to the users.

The timeslot controller 230 controls the timeslot allocation information. For example, the timeslot controller 230 controls the dropping and adding of channels. The timeslot controller 230 also updates the tables 225 and 250 with updated timeslot allocation information. The timeslot controller 230 further reallocates timeslot length according to updated timeslot allocation information. Accordingly, the timeslot controller 230 can increase or decrease the length of a timeslot, the number of timeslots, or the bandwidth allocated to a channel. The timeslot controller 230 can also couple non-adjacent timeslots into one virtual time slot. The updated timeslot allocation information includes information received from other access devices 112, information received from users 102, 104, and 106 and information regarding added and dropped channels. The timeslot allocation information further includes information regarding the allocation of the multiplexed timeslots for transmitted and received channels and the length of the multiplexed timeslots. For example, the timeslot allocation information includes the number of clock cycles allocated to input and output channels. The timeslot allocation information can also contain the corresponding characteristic data type (time stamp, packet sequence, etc.) of each timeslot whether carrying TDM or packetized data.

In operation, serial data enters the deserializer 215 and 215a, where it is deserialized and output to the demultiplexer 220. The demultiplexer 220 time division demultiplexes channels received according to timeslot allocation information located in the receiver table 225. At specified intervals, the demultiplexer 220 also demultiplexes updated timeslot allocation information from the serial data for updating the timeslot allocation information in the receiver table 225. The demultiplexer 220 drops some channels for sending to users 102, 104 and 106 through the output circuitry 235. The demultiplexer 220 also sends the remaining channels to the multiplexer 270.

The input circuitry 240 adds new channels from users 102, 104, and 106 which are sent to the multiplexer 270. The multiplexer 270 time division multiplexes the remaining channels, the new channels, and updated timeslot allocation information according to timeslot allocation information located in the transmitter table 250. The multiplexer 270 sends the multiplexed channels through the serializer 255 to the central office 120 and through the serializer 260 to the access device 112.

Figure 6:
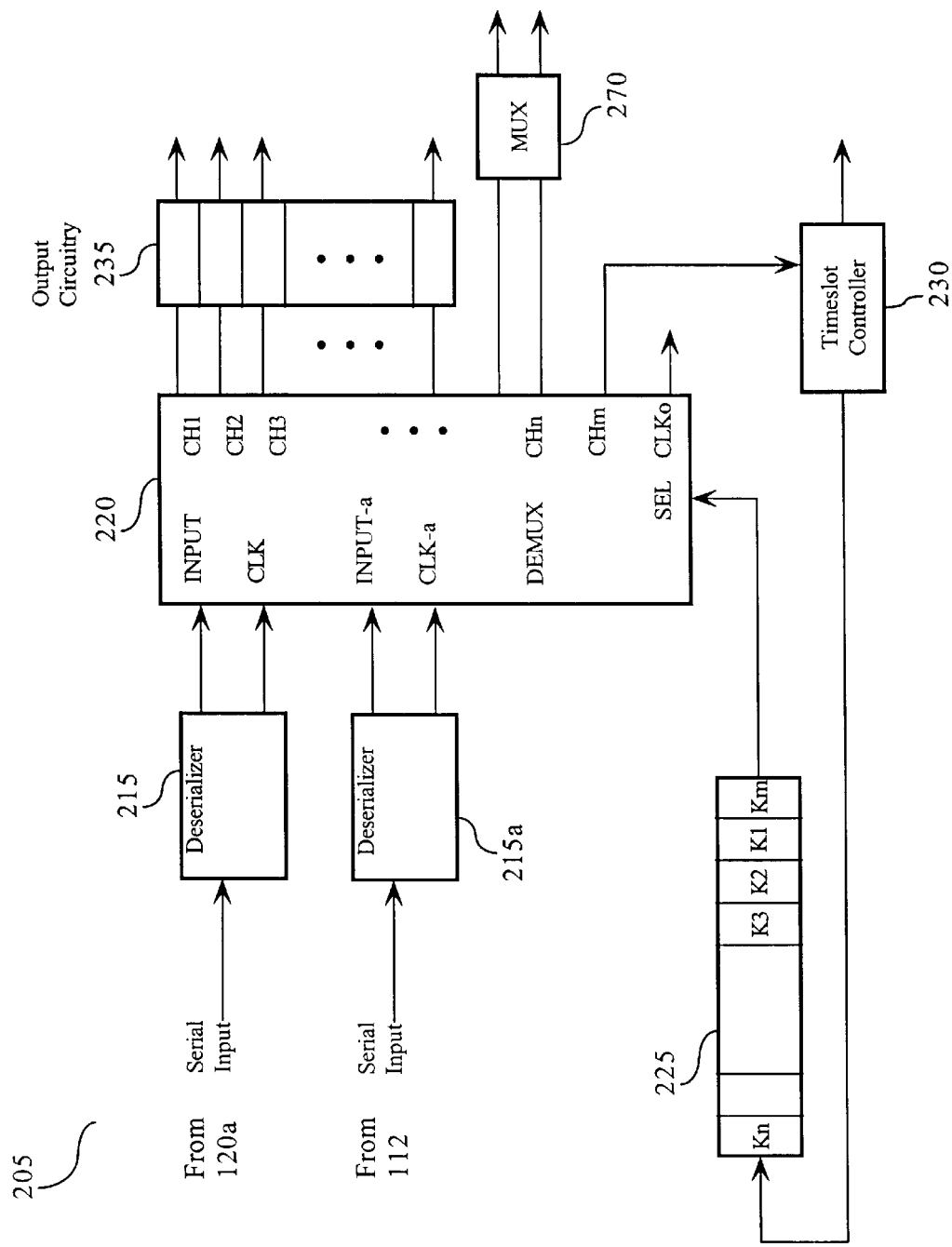
FIG. 6 is an exemplary illustration of the receiver of the access device according to a preferred embodiment.

FIG. 6 is an exemplary illustration of the receiver section 205 of the access device 110 according to a preferred embodiment. The receiver section 205 includes deserializers 215 and 215a, a demultiplexer 220, output circuitry 235, a receiver table 225, and a timeslot controller 230. The deserializer 215 or 215a deserializes received data and extracts a clock signal for the demultiplexer 220. The demultiplexer 220 demultiplexes channels 1–n. The demultiplexer 220 engages in time division demultiplexing with timing according to information in the receiver table 225. The receiver table 225 includes timeslot allocation information Ki for each timeslot (i=1 . . . n) and timeslot allocation information Km for timeslot allocation information management. The receiver table 225 can also be known as a channel selection pipe. Each Ki uses the SEL input of the demultiplexer 220 to select channel CHi as a demultiplexed output of the demultiplexer 220 for a specified number of clocks Ki where i represents the respective channel. The demultiplexer 220 also demultiplexes updated timeslot allocation information located in timeslot CHm. CHm is utilized for management. In particular, CHm is utilized to receive data for the receiver table 225 and to synchronize it with a multiplexer engine at the transmitter end of the central office's access device 120a and another access device 112. The timeslot controller 230 receives the updated timeslot allocation information and updates the tables 225 and 250 (not shown in FIG. 6) accordingly. In particular, the timeslot controller 230 updates channel allocations K1–Kn in accordance with the information received from CHm. For example, K3 includes the timeslot allocation information for channel 3. K3 indicates the amount of time and the number of timeslots allocated to channel 3 by the demultiplexer.

In operation, the deserializers 215 and 215a deserialize the serial input for the channels and the updated timeslot allocation information for the demultiplexer 220. The demultiplexer 220 demultiplexes channels CH1–CHn and the management channel CHm according to the timeslot allocation information located in the receiver table 225. The demultiplexer 220 outputs the channels CH1–CHn to either output circuit 235 or multiplexer 270 and the management channel CHm which includes the updated timeslot allocation information. The timeslot controller 230 updates the receiver table 225 with the updated timeslot allocation information for the next cycle of received data. The demultiplexer 220 also synchronizes clocks CLK and CLK-a from deserializers 215 and 215a and generates a master clock CLKo as a main clock source for the access device 110.

Figure 7:
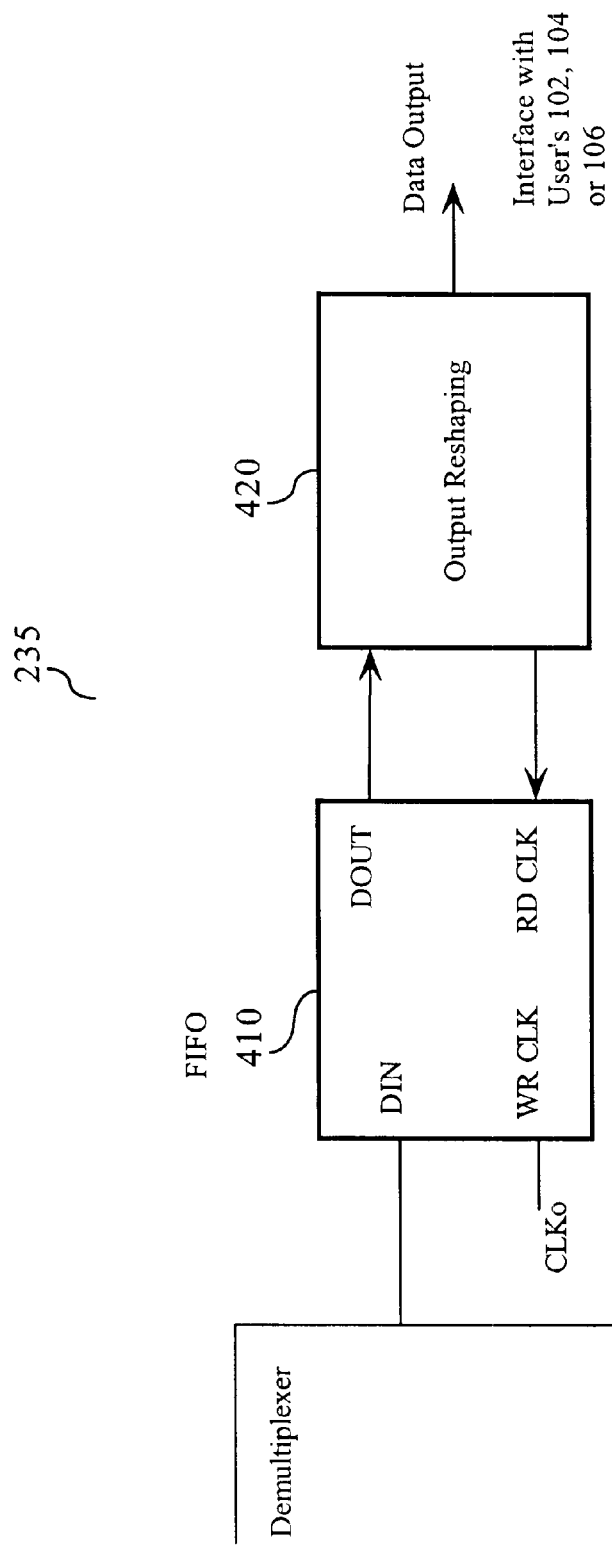
FIG. 7 is an exemplary illustration of the output circuitry of the receiver according to a preferred embodiment.

FIG. 7 is an exemplary illustration of the output circuitry 235 of the receiver section 205 according to a preferred embodiment. The output circuitry 235 includes a first in first out circuit (FIFO) 410 and output reshaping circuitry 420. The FIFO 410 buffers the data for output from the receiver section 205. The output reshaping circuitry 420 converts buffered data into a proper data format (e.g., Ethernet, video, etc.) and a clock speed for interface with a user's device.

Figure 8:
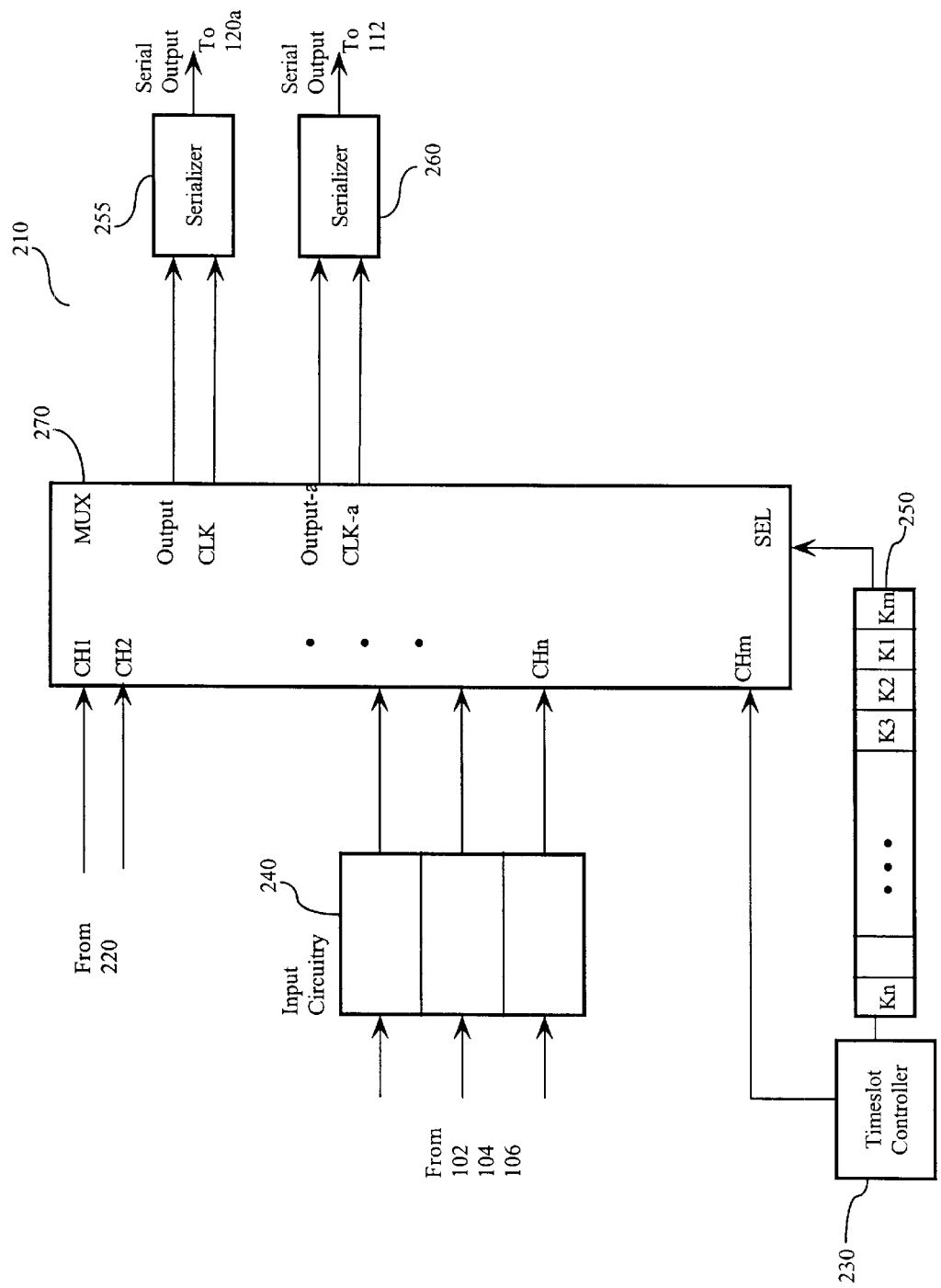
FIG. 8 is an exemplary illustration of the transmitter of the access device according to a preferred embodiment.

FIG. 8 is an exemplary illustration of the transmitter section 210 of the access device 110 according to a preferred embodiment. The transmitter section 210 includes a multiplexer 270, serializers 255 and 260, input circuitry 240, a timeslot controller 230, and a transmitter table 250. The multiplexer 270 accepts channels from input circuitry 240, demultiplexer 220, and a management channel CHm from the timeslot controller 230. The multiplexer 270 multiplexes all of these channels into at least one group with each group being transmitted to a different location (e.g., the central office 120 or other access device 112). Each group of multiplexed channel data is serialized by the serializers 255 and 260 before output.

The multiplexer 270 multiplexes the input channels in accordance with timeslot allocation information in the transmitter table 250. Each set of timeslot allocation information Ki in the transmitter table 250 will select a channel CHi as the multiplexer output for Ki clocks. Km is for timeslot allocation information management. The purpose of Km is to send the information in the transmitter table 250 itself to a demultiplexer engine at a receiving end. The aggregate bandwidth per channel is determined by each corresponding timeslot. Therefore, where there are n input channels each with bandwidth Bi, for example, in bits per second, the quantized input bandwidth Qi is determined from:

$$Qi=Ki*Q$$

Where Ki is the smallest integer such that Qi=Ki*Q>Bi. Q is the unit bandwidth for quantization, for example, 128 Kbps. Ki is the number of clock cycles allocated for each channel. Km is the number of clocks reserved for the management channel, for example, reserved for updated timeslot allocation information.

For clock allocation, the ratio of each channel's bandwidth is:

$$Q1:Q2:Q3:\ldots QN:Qm=K1Q:K2Q:K3Q:\ldots KnQ:KmQ=K1:K2:K3:\ldots Kn:Km$$

The total number of clocks to multiplex one round is:

$$KT=SUM(Ki)+Km$$

Figure 9:
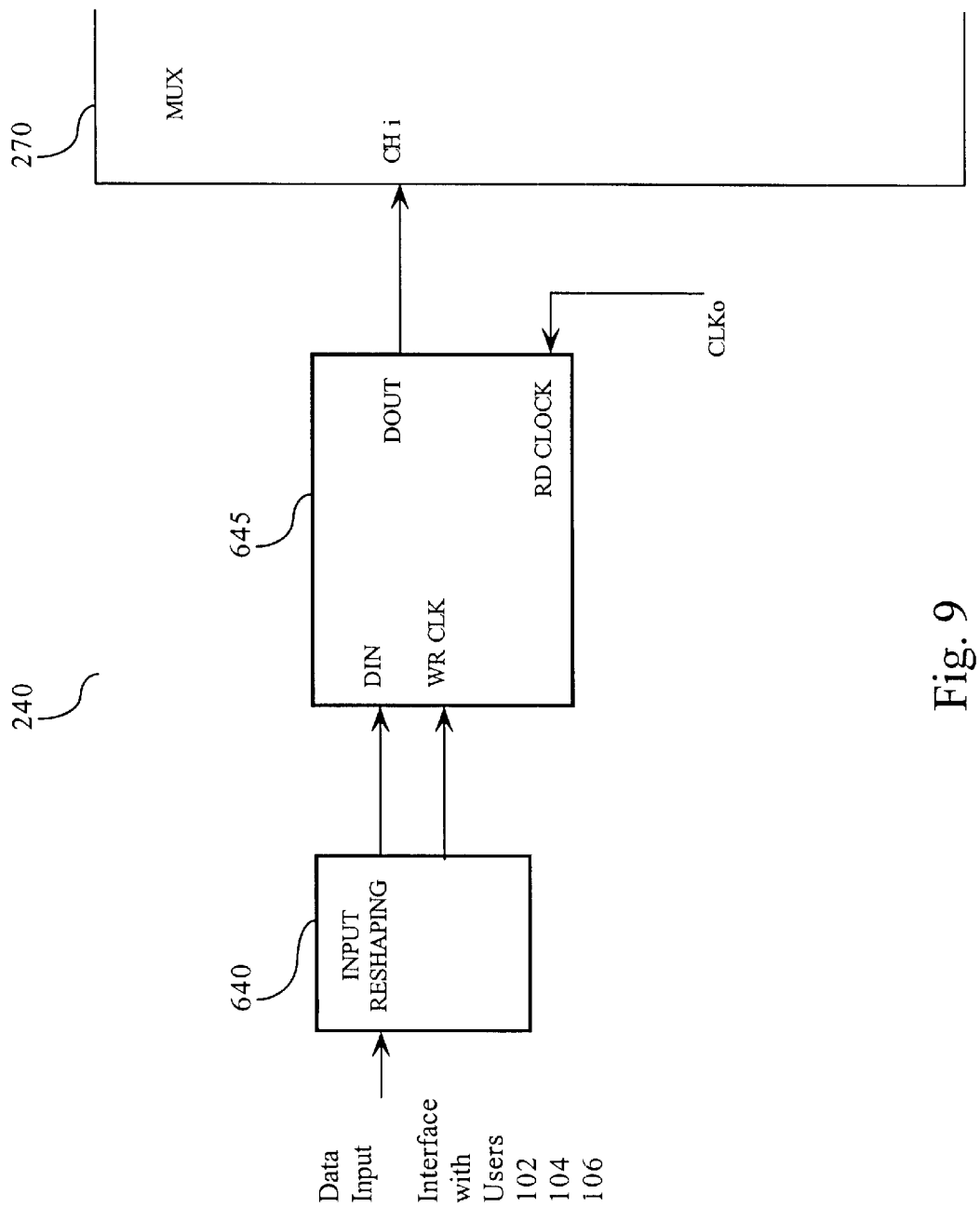
FIG. 9 is an exemplary illustration of input circuitry of the transmitter according to a preferred embodiment.

FIG. 9 is an exemplary illustration of input circuitry 240 of the transmitter section 210 according to a preferred embodiment. The input circuitry 240 includes input reshaping circuitry 640 and FIFO circuitry 645. The input reshaping circuitry 640 converts user's data (e.g., Ethernet, video, etc.) into a common data format with its corresponding clock. The FIFO 645 acts as a buffer. The input circuitry 240 also conditions the input. For example, the input circuitry 240 also reconditions a weak input signal into a strong input signal for the multiplexer 270.

Figure 10:
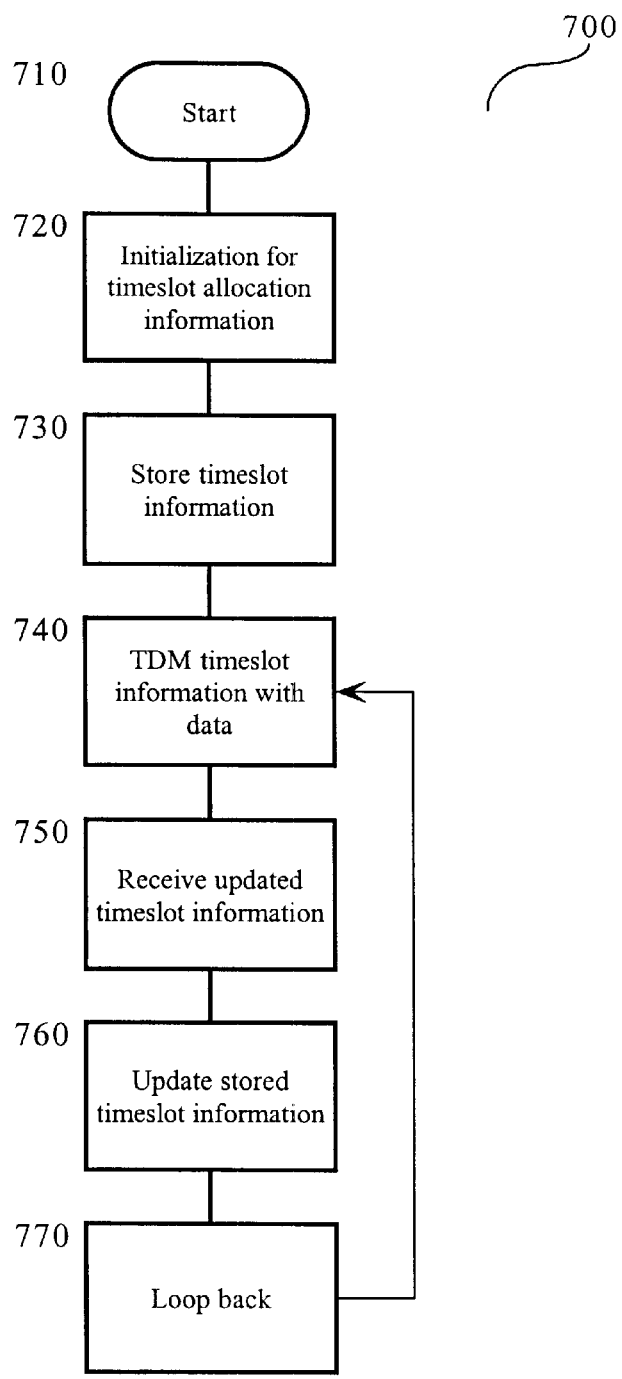
FIG. 10 is an exemplary flowchart outlining the operation of the access device according to a preferred embodiment.

FIG. 10 is an exemplary flowchart 700 outlining the operation of the access device 110 according to a preferred embodiment. In step 710 the flowchart begins. In step 720 the access device 110 initializes timeslot allocation information of at least one channel based on a user's request. In step 730 the access device 110 stores the timeslot allocation information into a timeslot allocation table. In step 740, the access device 110 time division multiplexes timeslot allocation information with transmitted data. In step 750, the access device 110 receives updated timeslot allocation information. In step 760, the access device 110 updates stored timeslot allocation information with the updated timeslot allocation information to reallocate a timeslot for the at least one channel. In step 770, the flowchart loops back to step 740 to repeat the process.

The updated timeslot allocation information can include information regarding the addition of channels to the existing channel. The updated timeslot allocation information can also include information regarding the subtraction or the dropping of channels from the existing channels. The updated timeslot information can also include information regarding increasing or decreasing the length of timeslots allocated to channels.

For example, when a user obtains a channel, such as channel 3, in the access device 110, the timeslot allocation information is initialized in step 720. Then, in step 730, the timeslot allocation information is stored in the timeslot allocation table 250 in location K3. In step 740, the timeslot allocation information is time division multiplexed in a management channel along with the other channels for transmission to the other access devices. If the user desires to change the user's timeslot allocation, the user does so and the updated timeslot allocation information is received in step 750. The access device 110 then updates the stored timeslot allocation information in the timeslot allocation table 250 with the updated timeslot allocation information in step 760.

Figure 11:
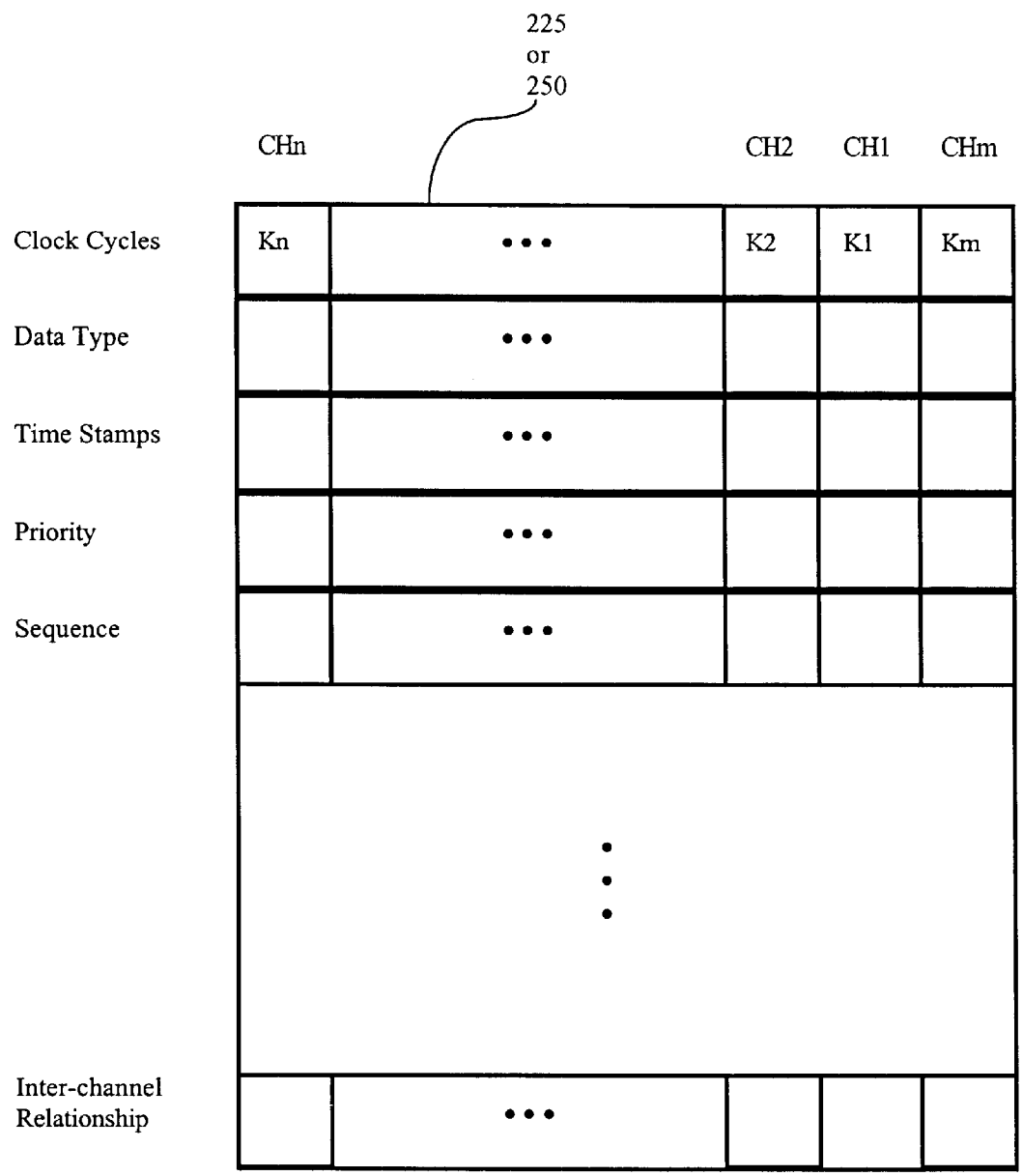
FIG. 11 is an exemplary illustration of the structure for the timeslot information allocation tables according to a preferred embodiment.

FIG. 11 is an exemplary illustration of the structure for the timeslot information allocation tables 225 or 250 according to a preferred embodiment. Because all channels are entirely independent from each other, different data types, whether TDM data, or packetized data, or others, can be assigned in each channel. In addition to clock cycle allocation, the characteristics, (including, but not limited to, data type, time stamps, priority, sequence, etc.) of each channel can be recorded in the corresponding section of the time slot allocation information table. This arrangement allows the access device 110 to deliver various data channels with proper timing synchronization, transmission priority, and data packet sequence. Thus, both TDM and packetized data traffic can be simultaneously transmitted through the access device 110 without affecting their original properties. In addition to the individual channel timeslot information, the timeslot information allocation table contains inter-channel relationship information which can be used to combine multiple non-adjacent timeslots into one virtual timeslot. For example, a space in the inter-channel relationship row can record the linking of CH3, CH5, and CH8, which indicate data in these three channels are in fact originated from the same source (or going to the same destination). Thus they are treated as one single virtual channel.

The method of this invention is preferably implemented on a programmed processor. However, access device 110 may also be implemented on a general purpose or special purpose computer, a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device on which resides a finite state machine capable of implementing the flowcharts shown in the Figures may be used to implement the controller functions of this invention.

While this invention has been described with specific embodiments thereof, it is evident that many alternatives, transformations, transpositions, modifications, and variations will be apparent to those skilled in the art. For example, various features of different embodiments of the invention can be combined and interchanged. Accordingly, the preferred embodiments of the invention as set forth herein are intended to be illustrative, not limiting. Various changes may be made without departing from the spirit and scope of the invention.

What is claimed is:

1. A first access device that provides access between an enterprise network and at least one of a metropolitan area network and a wide network, comprising:
    an enterprise area network connection providing connection to an enterprise area network;
    a controller coupled to the enterprise area network connection, the controller providing Layer 1 and layer 2 service; and
    a central office connection coupled to the controller and providing connection to a central office, the central office providing layer 3 and layer 4 service;
    wherein said controller comprises a first controller, said central office includes a second access device controller and said first controller transmits data through said central office connection to a second access device located at said central office;
    wherein said controller receives data from the enterprise area network connection and transmits multiple data formats across the central office connection to the central office using Layer 1 and layer 2 services.

2. An access device that provides access between an enterprise network and at least one of a metropolitan area network and a wide network comprising:
    an enterprise area network connection providing connection to an enterprise area network;
    a controller coupled to the enterprise area network connection, the controller providing Layer 1 and Layer 2 service; and
    a central office connection coupled to the controller and providing connection to a central office, the central office providing Layer 3 and Layer 4 service;
    wherein the controller further comprises:
        a timeslot allocation table including timeslot allocation information; and
        a transmitter coupled to the timeslot allocation table wherein the transmitter transmits data and updated timeslot allocation information in accordance with the timeslot allocation information.

3. A first access device for providing connection to a first local area networks and to a second local area network, comprising:
    a first local area network connection providing a connection to a first local area network;
    a second local area network connection providing a connection to a second local area network; and
    a first controller coupled to the first area network connection and coupled to the second local area network connection, the first controller providing Layer 1 service and Layer 2 service for direct connection of the first local area network to the second local area network without connection to a Layer 3 device;
    wherein the central office includes a second access device including a second controller and the first controller transmits data through the central office connection to the second controller of the second access device located at the central office;
    wherein said first controller receives data from the enterprise area network connection and transmits multiple data formats across the central office connection to the central office using Layer 1 and layer 2 services.

4. An access device for providing connection to a first local area network to a second local area network comprising:
    a first local area network connection providing a connection to a first local area netowrk;
    a second local area network connection providing a connection to a second local area network; and
    a controller coupled to the first local area network connection and coupled to the second local area network connection, the controller providing Layer 1 service and Layer 2 service for direct connection of the first local area network to the second local area network without connection to a Layer 3 device;
    wherein the controller further comprises:
        a timeslot allocation table including timeslot allocation information; and
        a transmitter coupled to the timeslot allocation table wherein the access device transmit data and updated timeslot allocation information in accordance with the timeslot allocation information.

5. The access device according to claim 1, wherein the central office maps multiple data formats onto appropriate Layer 3 and Layer 4 equipment.

6. The access device according to claim 1, wherein the controller receives data from the enterprise area network connection and transmits time division multiplexed (TDM) data, packetized data, video data, and audio data across the central office connection to the central office.

7. The access device according to claim 6, wherein the packetized data includes at least one of Ethernet, Fast Ethernet, Gigabit Ethernet, and Asynchronous Transfer Mode data, and the TDM data includes at least one of T1, DS1, T3, DS3, STS-1, or SONET data.

8. The access device according to claim 1, wherein the controller receives data from the enterprise area network connection and multiplexes the data received from the enterprise area network connection with other data.

9. The access device according to claim 8, wherein the enterprise area network connection comprises a first enterprise area network connection and the access device further comprises a second enterprise area network connection, wherein the controller receives second data from the second enterprise area network connection and multiplexes the second data with the data received from the first enterprise area network connection.

10. The access device according to claim 1, further comprising an access device connection, wherein the access device connection provides a connection to a second access device.

11. The access device according to claim 1, wherein the central office provides said Layer 3 and said Layer 4 service to at least one of said metropolitan area network and said wide area network.

12. The access device according to claim 2, wherein the controller receives data from the enterprise area network connection and provides dynamic timeslot allocation for transmitting the data through the central office connection to the central office.

13. The access device according to claim 2, further comprising a second access device connection, wherein the second access device connection provides a connection to a second access device.

14. The access device according to claim 13, wherein the controller receives data from the enterprise area network connection and provides dynamic timeslot allocation for transmitting the data through the second access device connection to the second access device.

15. The access device according to claim 2, further comprising a timeslot controller coupled to the timeslot allocation table, wherein the timeslot controller receives updated timeslot allocation information and updates the timeslot allocation table with the updated timeslot allocation information.

16. The access device according to claim 15, wherein the updated timeslot allocation information includes information regarding the addition of channels.

17. The access device according to claim 15, wherein the updated timeslot allocation information includes information regarding the removal of channels.

18. The access device according to claim 17, wherein the controller receives data from the first local area network connection and transmits data across the second local area network connection to the second local area network.

19. The access device according to claim 18, wherein the controller transmits time division multiplexed data, packetized data, video data, and audio data across the second local area network connection to the second local area network.

20. The access device according to claim 17, further comprising a central office connection coupled to a central office, the central office providing Layer 3 and Layer 4 service.

21. The access device according to claim 20, further comprising a second access device connection, wherein the second access device connection provides a connection to a second access device.

22. The access device according to claim 20, wherein the central office provides Layer 3 and Layer 4 service to at least one of a metropolitan area network and the wide area network.

23. The access device according to claim 4, further comprising a timeslot controller coupled to the timeslot allocation table, wherein the timeslot controller receives updated timeslot allocation information and updates the timeslot allocation table with the updated timeslot allocation information.

24. The access device according to claim 23, wherein the updated timeslot allocation information includes information regarding the addition of channels.

25. The access device according to claim 23, wherein the updated timeslot allocation information includes information regarding the removal of channels.

* * * * *